United States Patent
Masuda et al.

(10) Patent No.: US 9,435,503 B2
(45) Date of Patent: Sep. 6, 2016

(54) AUTOMOTIVE LAMP

(71) Applicant: Koito Manufacturing Co., Ltd., Minato-ku (JP)

(72) Inventors: Takeshi Masuda, Shizuoka (JP); Yuichi Shibata, Shizuoka (JP); Naoki Uchida, Shizuoka (JP); Mitsuyuki Mochizuki, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 14/284,495

(22) Filed: May 22, 2014

(65) Prior Publication Data

US 2014/0254188 A1    Sep. 11, 2014

Related U.S. Application Data

(63) Continuation of application No. PCT/JP2012/007773, filed on Dec. 4, 2012.

(30) Foreign Application Priority Data

Dec. 15, 2011    (JP) ................. 2011-274708

(51) Int. Cl.
*F21V 21/00* (2006.01)
*F21S 8/10* (2006.01)
(Continued)

(52) U.S. Cl.
CPC ............. *F21S 48/12* (2013.01); *B60Q 1/0023* (2013.01); *B60Q 1/0683* (2013.01); *B60Q 1/085* (2013.01);
(Continued)

(58) Field of Classification Search
CPC .. F21S 48/12; F21S 48/1154; F21S 48/1388; F21S 48/1757; F21S 48/1145; F21S 48/1131; F21S 48/1323; F21S 48/328; B60Q 1/0023; B60Q 11/00; B60Q 1/0683; B60Q 1/085; B60Q 2300/32
See application file for complete search history.

(56) References Cited

U.S. PATENT DOCUMENTS 5,426,294 A  *  6/1995  Kobayashi et al. .......... 250/226
2004/0149998 A1 * 8/2004  Henson et al. ................. 257/98
(Continued)

FOREIGN PATENT DOCUMENTS

CN    101825237 A    9/2010
CN    102171608 A    8/2011
(Continued)

OTHER PUBLICATIONS

International Preliminary Report on Patentability (Form PCT/IB/373) issued on Jun. 17, 2014 and the Written Opinion of the International Searching Authority (Form PCT/ISA/237) issued on Mar. 3, 2013, by the International Bureau of WIPO in corresponding International Application No. PCT/JP2012/007773, and an English Translation.
(Continued)

*Primary Examiner* — Ali Alavi
(74) *Attorney, Agent, or Firm* — Buchanan Ingersoll & Rooney PC

(57) ABSTRACT

An automotive lamp includes a first light source for emitting the red laser light, a second light source for emitting the green laser light a third light source for emitting the blue laser light, a light condensing unit for collecting at least the red laser light, the green laser light and the blue laser light so as to generate the white laser light, and a light distribution unit for distributing the white laser light so as to form a predetermined light distribution pattern.

12 Claims, 7 Drawing Sheets

(51) Int. Cl.
*B60Q 1/00* (2006.01)
*B60Q 1/08* (2006.01)
*B60Q 11/00* (2006.01)
*B60Q 1/068* (2006.01)

(52) U.S. Cl.
CPC ............ *B60Q 11/00* (2013.01); *F21S 48/1131* (2013.01); *F21S 48/1145* (2013.01); *F21S 48/1154* (2013.01); *F21S 48/1323* (2013.01); *F21S 48/1388* (2013.01); *F21S 48/1757* (2013.01); *F21S 48/328* (2013.01); *B60Q 2300/146* (2013.01); *B60Q 2300/20* (2013.01); *B60Q 2300/32* (2013.01); *B60Q 2300/45* (2013.01)

(56) References Cited

U.S. PATENT DOCUMENTS

| | | | | |
|---|---|---|---|---|
| 2007/0297171 | A1* | 12/2007 | Berben et al. | 362/231 |
| 2008/0198615 | A1* | 8/2008 | Klipstein | 362/538 |
| 2009/0046474 | A1 | 2/2009 | Sato et al. | |
| 2010/0014304 | A1* | 1/2010 | Frey et al. | 362/507 |
| 2010/0091516 | A1* | 4/2010 | Harle et al. | 362/554 |
| 2010/0110660 | A1* | 5/2010 | Brukilacchio | 362/84 |
| 2011/0194270 | A1* | 8/2011 | Di Trapani et al. | 362/2 |
| 2011/0235356 | A1* | 9/2011 | Sato | F21S 48/1159 362/510 |
| 2011/0249460 | A1* | 10/2011 | Kushimoto | B60Q 1/085 362/510 |
| 2011/0280033 | A1* | 11/2011 | Kishimoto et al. | 362/543 |
| 2011/0280039 | A1* | 11/2011 | Kishimoto | B60Q 1/0011 362/554 |
| 2011/0292636 | A1* | 12/2011 | Fukai et al. | 362/19 |
| 2012/0051027 | A1* | 3/2012 | Takahashi et al. | 362/84 |
| 2012/0051074 | A1* | 3/2012 | Takahashi | 362/509 |
| 2012/0106178 | A1* | 5/2012 | Takahashi et al. | 362/459 |
| 2012/0106183 | A1* | 5/2012 | Takahashi | 362/509 |
| 2012/0106188 | A1* | 5/2012 | Takahashi et al. | 362/516 |
| 2012/0106189 | A1* | 5/2012 | Takahashi et al. | 362/538 |
| 2012/0200218 | A1* | 8/2012 | Maemura et al. | 313/483 |
| 2012/0314442 | A1* | 12/2012 | Takahashi et al. | 362/538 |
| 2013/0010492 | A1* | 1/2013 | Montgomery et al. | 362/553 |
| 2013/0027962 | A1* | 1/2013 | Takahashi et al. | 362/538 |
| 2013/0208496 | A1* | 8/2013 | Kishimoto | 362/553 |
| 2013/0235601 | A1* | 9/2013 | Takahashi | 362/465 |
| 2013/0265561 | A1* | 10/2013 | Takahira | F21V 7/06 356/3 |
| 2013/0314896 | A1* | 11/2013 | Finsterbusch | 362/84 |
| 2014/0056021 | A1* | 2/2014 | Takahira et al. | 362/551 |
| 2014/0204398 | A1* | 7/2014 | Sato et al. | 356/614 |

FOREIGN PATENT DOCUMENTS

| | | |
|---|---|---|
| DE | 102008022795 A1 | 11/2009 |
| JP | 2005-150041 A | 6/2005 |
| JP | 2009-048786 A | 3/2009 |
| JP | 2010-134360 A | 6/2010 |
| JP | 2011-157022 A | 8/2011 |
| WO | 2010039351 A1 | 4/2010 |

OTHER PUBLICATIONS

International Search Report (PCT/ISA/210) issued on Mar. 5, 2013 with an English Translation. (2 pages).
Notification of Reason(s) for Refusal dated Aug. 4, 2015 issued in the corresponding Japanese Patent Application No. 2011-274708 and English translation (4 pages).
First Office Action dated Aug. 11, 2015 issued in the corresponding Chinese Patent Application No. 201280061553.7 and English translation (12 pages).
Communication and Supplementary Search Report dated Nov. 12, 2015 issued in the corresponding European Patent Application No. 12857596.6 (6 pages).
Notification of Reason(s) for Refusal dated Feb. 9, 2016 issued in the corresponding Japanese Patent Application No. 2011-274708 (4 pages).
Second Office Action dated Apr. 18, 2016 issued in the corresponding Chinese Patent Application No. 201280061553.7 and English translation (12 pages).

* cited by examiner

AUTOMOTIVE LAMP

BACKGROUND OF THE INVENTION

1. Field of the Invention

The present invention relates to an automotive lamp, and more particularly to an automotive lamp used for a vehicle such as an automobile.

2. Description of the Related Art

Reference (1) in the following Related Art List discloses an automotive lamp comprised of semiconductor light-emitting elements, such as laser diodes, and a fluorescent material (phosphor). In this automotive lamp, the phosphor is irradiated with ultraviolet light emitted from the semiconductor light-emitting elements. The phosphor receives the ultraviolet light and thereby produces white light. The white light produced by the phosphor is irradiated toward a front area of the lamp. This forms a predetermined light distribution pattern.

RELATED ART LIST (1) Japanese Unexamined Patent Application Publication (Kokai) No. 2005-150041.

The automotive lamp has a function of improving the visibility of a driver by forming a predetermined light distribution pattern by irradiating a front area of a vehicle with light emitted from the lamp. However, it is always required of the automotive lamp that the visibility of the driver be further improved for the purpose of assuring the safety of the driver of the vehicle, pedestrians and so forth.

SUMMARY OF THE INVENTION

The present invention has been made in view of these problems, and a purpose thereof is to provide an automotive lamp capable of further improving the visibility of a driver.

In order to resolve the above-described problems, one embodiment of the present invention relates to an automotive lamp. The automotive lamp includes: a first light source configured to emit a red laser light; a second light source configured to emit a green laser light; a third light source configured to emit a blue laser light; a light condensing unit configured to collect at least the red laser light, the green laser light and the blue laser light so as to generate a white laser light; and a light distribution unit configured to distribute the white laser light so as to form a predetermined light distribution pattern.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
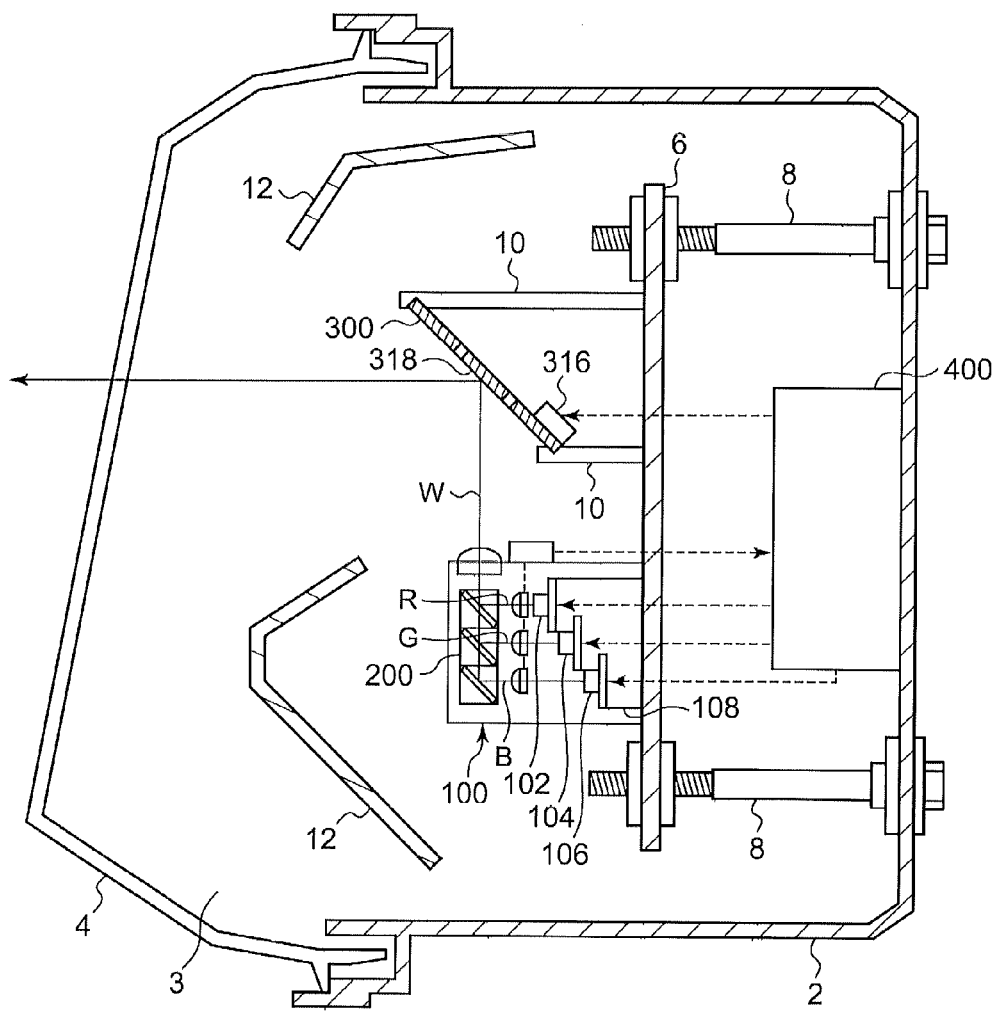
FIG. 1 is a vertical cross-sectional view schematically showing a structure of an automotive lamp according to a first embodiment of the present invention.

Hereinafter, the present invention will be described based on preferred embodiments with reference to the accompanying drawings. The same or equivalent constituents, members, or processes illustrated in each drawing will be denoted with the same reference numerals, and the repeated description thereof will be omitted as appropriate.

The preferred embodiments do not intend to limit the scope of the invention but exemplify the invention. All of the features and the combinations thereof described in the embodiments are not necessarily essential to the invention.

(First Embodiment)

FIG. 1 is a vertical cross-sectional view schematically showing a structure of an automotive lamp according to a first embodiment of the present invention. In FIG. 1, a light source unit 100 is shown in a state where the interior of a light source unit 100 is seen through. Note that permanent magnets 312 and 314 of a light distribution unit 300 are omitted in FIG. 1. The automotive lamp according to the present embodiment is an automotive headlamp apparatus, for instance, and the automotive headlamp apparatus has a pair of headlamp units formed bilaterally symmetrical to each other. The pair of headlamp units are such that one of the headlamp units is provided in a left-side front part of a vehicle and such that the other thereof is provided in a right-side front part thereof. FIG. 1 shows either one of those left- and right-hand headlamp units. Since the other of headlamp units is of practically identical structure to that of the headlamp unit shown in FIG. 1, except that it has a bilaterally symmetrical structure, the description of the other thereof will be omitted.

An automotive lamp 1 according to the present embodiment includes a lamp body 2 having an opening disposed frontward of the vehicle and a transparent cover 4, which is so mounted as to cover the opening of the lamp body 2. The transparent cover 4 is formed of resin or glass having translucency, for instance. A lamp chamber 3, which is formed by the lamp body 2 and the transparent cover 4, contains a supporting plate 6, a light source unit 100, a light distribution unit 300, and a control unit 400.

The light source unit 100 and the light distribution unit 300 are supported by the supporting plate 6 at predetermined positions in the lamp chamber 3. The supporting plate 6 is connected to the lamp body 2 by aiming screws 8 at corners of the supporting plate 6. The light source unit 100 has a first light source 102, a second light source 104, a third light source 106, a heatsink 108, a light condensing unit 200, and so forth. The light source unit 100 is fixed in front of the supporting plate 6 such that the heatsink 108 is in contact with the supporting plate 6. A detailed description will be given later of the internal structure of the light source unit 100.

The light distribution unit 300 has a reflector 318. The light distribution unit 300 is positioned relative to the light source unit 100 in a predetermined manner such that laser light emitted from the light source unit 100 is reflected in a frontward direction of the lamp. And the light distribution unit 300 is secured to a tip of a protrusion 10 that protrudes in a frontward direction of the lamp from the front surface of the supporting plate 6. A detailed description will be given later of the structure of the light distribution unit 300. The control unit 400 is secured to the lamp body 2 such that the control unit 400 is located behind the supporting plate 6 toward the rear end of the lamp. The position where the control unit 400 is provided is not particular limited to this position.

The position (posture) of the supporting plate 6 is adjusted by rotating the aiming screws 8. Thus, the automotive lamp 1 is structured so that a light axis thereof can be adjusted in the horizontal and vertical directions. An extension reflector 12, having an opening that allows the light reflected by the light distribution unit 300 to travel toward a front area of the lamp, is provided in a part of the lamp located anterior to the light source unit 100 and the light distribution unit 300 in the lamp chamber 3.

A detailed description is, given hereunder of each component that constitutes the automotive lamp 1.

(Light Source Unit)

Figure 2:
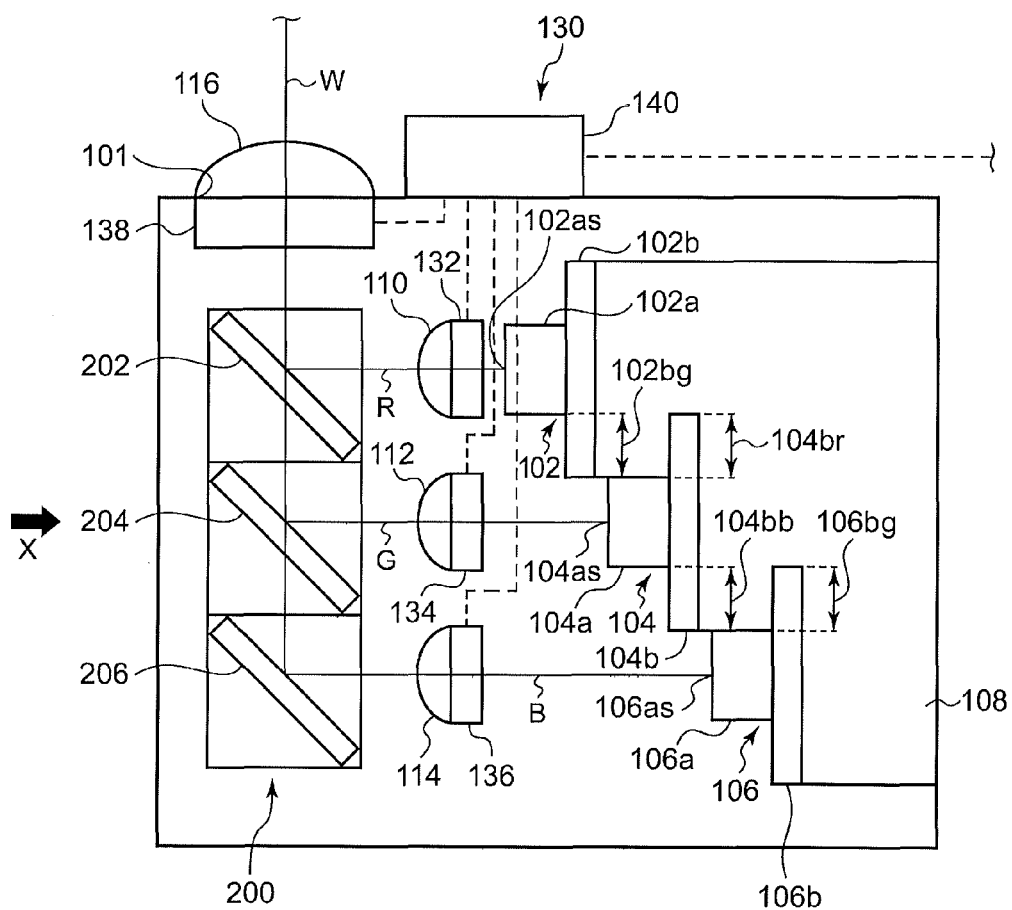
FIG. 2 is a side view schematically showing a structure of a light source unit.

FIG. 2 is a side view schematically showing a structure of the light source unit. Note that FIG. 2 is a transparent view showing the interior of the light source unit 100. The light source unit 100 has a first light source 102, a second light source 104, a third light source 106, a heatsink 108, a first lens 110, a second lens 112, a third lens 114, a fourth lens 116, and a light condensing unit 200.

The first light source 102, which is a light source that emits red laser light R, has a light-emitting element 102a constituted by a red laser diode and a substrate 102b mounting the light-emitting element 102a. The second light source 104, which is a light source that emits green laser light G, has a light-emitting element 104a constituted by a green laser diode and a substrate 104b mounting the light-emitting element 104a. The third light source 106, which is a light source that emits blue laser light B, has a light-emitting element 106a constituted by a blue laser diode and a substrate 106b mounting the light-emitting element 106a. In the present embodiment, a laser light emission surface 102as of the light-emitting element 102a, a laser light emission surface 104as of the light-emitting element 104a, and a laser light emission surface 106as of the light-emitting element 106a are parallel to each other. Each light source may have a laser device other than the laser diode.

The first light source 102, the second light source 104 and the third light source 106 are arranged such that their respective laser light emission surfaces face a front area of the lamp. Also, the first to third light sources 102, 104 and 106 are mounted on a side surface of the heatsink 108 that faces a front area of the lamp. The heatsink 108 is formed of a material, having a high thermal conductivity, such as aluminum, for the purpose of efficiently recovering the heat produced by the light-emitting elements 102a to 106a of the light sources. A rear-side surface of the heatsink 108 is in contact with the supporting plate 6 (see FIG. 1). The heat produced by the light-emitting elements 102a to 106a are radiated through the substrates 102b to 106b, with which the light-emitting elements 102a to 106a are respectively in contact, the heatsink 108 and the supporting plate 6. This suppresses the rise in temperature.

The first lens 110, the second lens 112, the third lens 114, and the fourth lens 116 are each a collimator lens. The first lens 110 is provided on a light path of the red laser light R between the first light source 102 and the light condensing unit 200, converts the red laser light R emitted from the first light source 102 into parallel light, and emits the parallel light to the light condensing unit 200. The second lens 112 is provided on a light path of the green laser light G between the second light source 104 and the light condensing unit 200, converts the green laser light G emitted from the second light source 104 into parallel light, and emits the parallel light to the light condensing unit 200.

The third lens 114 is provided on a light path of the blue laser light B between the third light source 106 and the light condensing unit 200, converts the blue laser light B emitted from the third light source 106 into parallel light, and emits the parallel light to the light condensing unit 200. The fourth lens 116 is fitted to the opening provided in a housing of the light source unit 100. The fourth lens 116 is provided on a light path of white laser W discussed later between the light condensing unit 200 and the light distribution unit 300 (see FIG. 1). The fourth lens 116 converts the white laser light W emitted from the light condensing unit 200 into parallel light and emits the parallel light to the light distribution unit 300.

The light condensing unit 200 collects the red laser light R, the green laser light G and the blue laser light B so as to generate the white laser light W. The light condensing unit 200 has a first dichroic mirror 202, a second dichroic mirror 204 and a third dichroic mirror 206.

The first dichroic mirror 202 is a mirror that reflects at least the red light and transmits the blue light and the green light, and is arranged such it reflects the red laser light R, which has passed through the first lens 110, toward the fourth lens 116. The second dichroic mirror 204 is a mirror that reflects at least the green light and transmits the blue light, and is arranged such it reflects the green laser light G, which has passed through the second lens 112, toward the fourth lens 116. The third dichroic mirror 206 is a mirror that reflects at least the blue light, and is arranged such it reflects the blue laser light B, which has passed through the third lens 114, toward the fourth lens 116.

A mutual positional relation among the first dichroic mirror 202, the second dichroic mirror 204 and the third dichroic mirror 206 is determined such that the light paths of the laser lights reflected by the first to third dichroic mirrors 202, 204 and 206 are parallel to each other and such that their respective laser lights are collected and the thus collected light enters the fourth lens 116. In the present embodiment, the first dichroic mirror 202 to the third dichroic mirror 206 are arranged such that the areas where the laser lights strike on the respective dichroic mirrors, namely the reflecting points of laser lights, are aligned on a same line.

The blue laser light B emitted from the third light source 106 is reflected by the third dichroic mirror 206 and then travels toward the second dichroic mirror 204. The green laser light G emitted from the second light source 104 is reflected by the second dichroic mirror 204 toward the first dichroic mirror 202 and, at the same time, the thus reflected light is superposed on the blue laser light B that has transmitted the second dichroic mirror 204. The red laser light R emitted from the first light source 102 is reflected by the first dichroic mirror 202 toward the fourth lens 116 and, at the same time, the thus reflected light is superposed on the aggregate light of the blue laser light B and the green laser light G, which have transmitted the first dichroic mirror 202.

As a result, the white laser light W is formed. The white laser light W passes through the fourth lens 116 and travels toward the light distribution unit 300.

The first light source 102 to the third light source 106 are placed in their respective positions as follows. The first light source 102, which emits the red laser light R, is arranged in a position nearest from the light condensing unit 200. The third light source 106, which emits the blue laser light B, is arranged in a position farthest from the light condensing unit 200. The second light source 104, which emits the green laser light G, is arranged in an intermediate position between the first light source 102 and the third light source 106. In other words, the first light source 102 to the third light source 106 are arranged such that the longer the wavelength of laser light emitted therefrom is, closer to the light condensing unit 200 the light source is located. The longer the wavelength of laser light is, the larger the spread angle of laser light will become. For this reason, a light source emitting the laser light that is more likely to spread is arranged in a position nearer to the light condensing unit 200. This can suppress the drop in the quantity of laser light incident on the light condensing unit 200 on account of the diffusion of laser light and therefore the utilization of laser light can be enhanced. Also, this can suppress the incident light quantity of each laser light to the light condensing unit 200 from causing a difference among each other due to a difference in the spread angle of each laser light.

Also, the first light source 102 to the third light source 106 are arranged such that parts of the substrates of adjacent light sources overlap with each other, as viewed from a direction that intersects with the laser light emission surfaces 102*as* to 106*as* of the respective light sources. In other words, the first light source 102 to the third light source 106 are arranged such that parts thereof overlap with each other, as viewed from the direction of arrow X in FIG. 2, namely, the direction parallel to a laser light emission direction of each light source or the direction intersecting with a main face of the substrate of each light source. In the present embodiment, the first light source 102 and the second light source 104 are arranged such that a region 102*bg* of the substrate 102*b* on a second light source 104 side overlaps with a region 104*br* of the substrate 104*b* on a first light source 102 side. Also, the second light source 104 and the third light source 106 are arranged such that a region 104*bb* of the substrate 104*b* on a third light source 106 side overlaps with a region 106*bg* of the substrate 106*b* on a second light source 104 side. Thereby, the laser light emission surfaces 102*as* to 106*as* of the respective light sources can be placed in close proximity to each other, as viewed from the direction of arrow X in FIG. 2. As a result, the size of the light condensing unit 200 can be reduced and consequently the overall size of the light source unit 100 can be reduced.

Consider, for example, a case where a plurality of light sources are provided for each color in order to enhance the irradiation intensity of laser light. In this case, the laser light of the same color can be easily collected when the light sources of the same color are arranged on different levels as described above and their laser light emission surfaces are placed in close proximity to each other. As a result, the width of laser light can be made narrower and the light source image can be made smaller. Also, groups of light sources for three colors may be arranged on different levels as described above.

The light source unit 100 has a monitoring unit 130 that monitors the emission of laser light from each light source. The monitoring unit 130 has a first photosensor 132, a second photosensor 134, a third photosensor 136, a fourth photosensor 138, and an abnormality determining unit 140. The first photosensor 132 measures the irradiation intensity of the red laser light R emitted from the first light source 102. The second photosensor 134 measures the irradiation intensity of the green laser light G emitted from the second light source 104. The third photosensor 136 measures the irradiation intensity of the blue laser light B emitted from the third light source 106. The fourth photosensor 138 measures the irradiation intensity of the white laser light W emitted from the light condensing unit 200. Each photosensors transmits a signal indicative of a measured value to the abnormality determining unit 140.

The abnormality determining unit 140 determines whether or not any abnormality occurs in the emission of laser light at each light source. The "emission abnormality" or "irradiation abnormality" as used herein indicates that the aggregate light lies outside a predetermined white range as a result of an abnormality. Thus, even if the emission thereof deviates from a set value, such a case will be excluded from the "emission abnormality" as long as the aggregate light lies within the predetermined white range. If, for example, the irradiation intensity of laser light emitted from each light source lies outside a predetermined range, the abnormality determining unit 140 will determine that an abnormality occurs in the emission of laser light. Also, the abnormality determining unit 140 determines whether or not the irradiation intensity of the white laser light W, which is an aggregate light, is contained in a predetermined range of values. The abnormality determining unit 140 transmits a signal indicating a determination result to a lamp ECU 402 (see FIG. 5). It is to be noted that the abnormality determining unit 140 may be provided inside the lamp ECU 402 instead.

(Light Distribution Unit)

Figure 3:
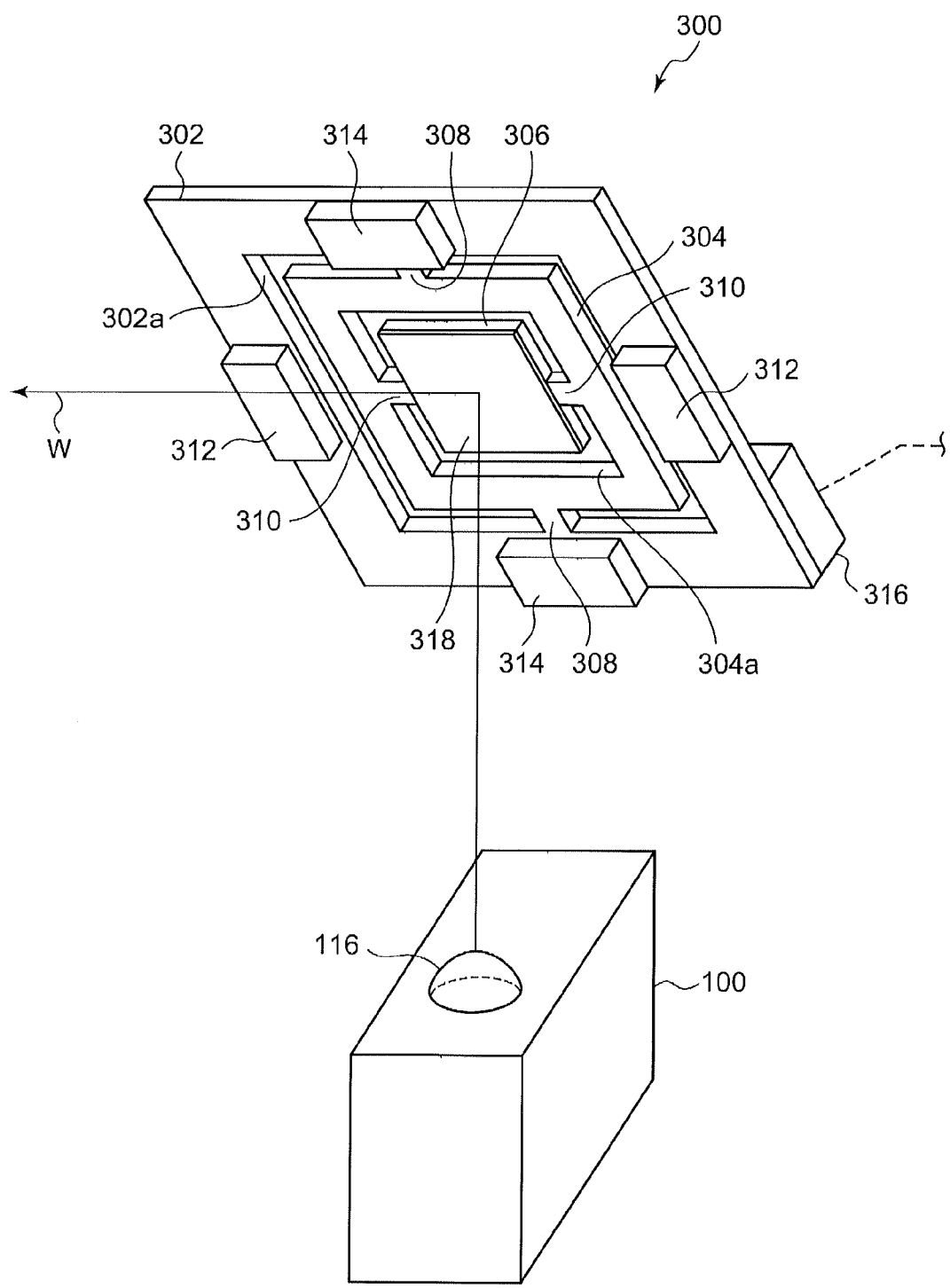
FIG. 3 is a schematic perspective view of a light distribution unit as observed from a front side of a lamp.

FIG. 3 is a schematic perspective view of a light distribution unit as observed from a front side of the lamp. The light distribution unit 300, which is configured by a galvanometer mirror, includes a base 302, a first rotating body 304, a second rotating body 306, first torsion bars 308, second torsion bars 310, permanent magnets 312 and 314, a terminal part 316, a reflector 318, and so forth. The base 302 is a frame body having an opening 302*a* in the center, and is secured to the tip of the protrusion 10 (see FIG. 1) such that the base 302 is tilted in the longitudinal directions of the lamp. The terminal part 316 is provided in a predetermined position of the base 302. The first rotating body 304 is arranged in the opening 302*a* of the base 302. The first rotating body 304 is a frame body having an opening 304*a* in the center, and is turnably supported by the first torsion bars 308, which extend from a rear lower side to a frontal upper side of the lamp, laterally (in the vehicle width direction) in relation to the base 302.

The second rotating body 306 is arranged in an opening 304*a* of the first rotating body 304. The second rotating body 306 is a rectangular plate, and is turnably supported by the second torsion bars 310, which extend in the vehicle width direction, vertically in relation to the first rotating body 304. When the first rotating body 304 is turned laterally with the first torsion bars 308 as a turning shaft, the second rotating body 306 is turned laterally together with the first rotating body 304. The reflector 318 is provided on the surface of the second rotating body 306 by use of a plating, vapor deposition or like method.

A pair of permanent magnets 312 are provided on the base 302 in a position orthogonal to the direction along which the first torsion bars 308 extend. The permanent magnets 312 form a magnetic field running orthogonal to the first torsion bars 308. A first coil (not shown) is wired in the first rotating body 304, and the first coil is connected to the control unit 400 via the terminal part 316. Also, a pair of permanent magnets 314 are provided on the base 302 in a position orthogonal to the direction along which the second torsion bars 310 extend. The permanent magnets 314 form a magnetic field running orthogonal to the second torsion bars 310. A second coil (not shown) is wired in the second rotating body 306, and the second coil is connected to the control unit 400 via the terminal part 316.

Figure 5:
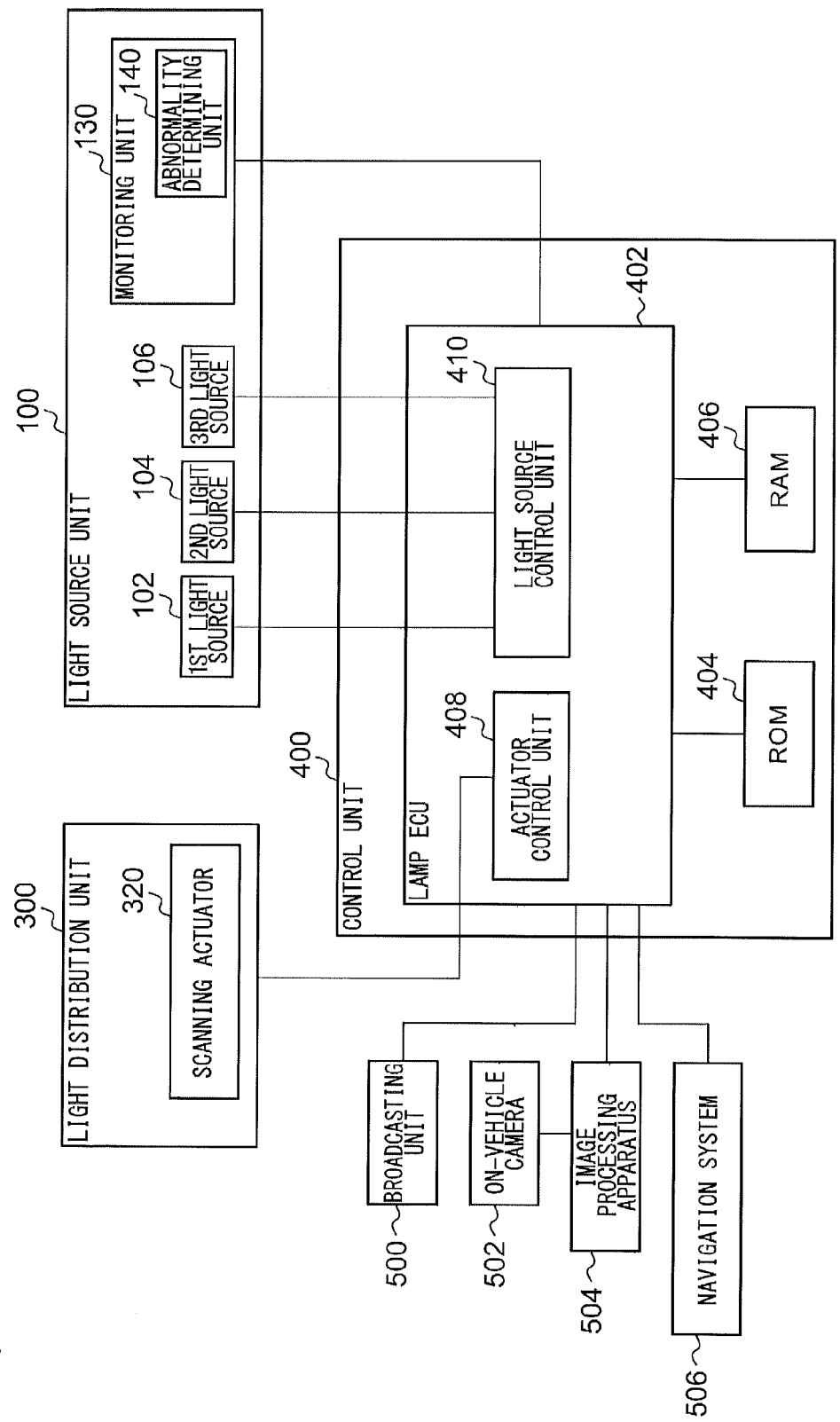
FIG. 5 is a functional block diagram for explaining a control unit.

The first coil and the permanent magnets 312, and the second coil and the permanent magnets 314 constitute a scanning actuator 320 (see FIG. 5). The drive of the scanning actuator 320 is controlled by an actuator control unit 408 (see FIG. 5) described later. The actuator control unit 408 controls the amount and the direction of electric current flowing through the first coil and the second coil. Controlling the amount and the direction of electric current flowing therethrough enables the first rotating body 304 and the second rotating body 306 to turnably reciprocate from side to side (laterally) and enables the second rotating body 306 to turnably reciprocate vertically independently. Thereby, the reflector 318 makes turnably reciprocating movements in vertical and lateral directions.

A mutual positional relation between the light source unit 100 and the light distribution unit 300 is determined such that the white laser light W emitted from the light source unit 100 is reflected by the reflector 318 toward a front area of the lamp. Then the light distribution unit 300 scans a front area of the vehicle using the white laser light W by the turnably reciprocating movement of the reflector 318. For example, the light distribution unit 300 scans a region of a light distribution pattern to be formed, using the white laser light W. Thereby, the white laser light W is distributed over the region where the light distribution pattern is formed and, as a result, a predetermined light distribution pattern is formed in the front area of the vehicle (in the front area of the lamp).

The control unit 400 may have a light source control unit 410, described later (see FIG. 5), control the emission of laser light from the first light source 102, the second light source 104 and the third light source 106, in accordance with the scanning of the front area of the lamp using the white laser light W by the light distribution unit 300. For example, the light distribution unit 300 turns the reflector 318 over a scanning range wider than the region where the light distribution pattern is formed. Then the light source control unit 410 turns on each light source when the turning position of the reflector 318 is in a position corresponding to the region of the light distribution pattern to be formed. Such a control as this can form the predetermined pattern in front of the lamp. In this case, the light source control unit 410 of the control unit 400 constitutes a part of the light distribution unit 300.

Figure 4:
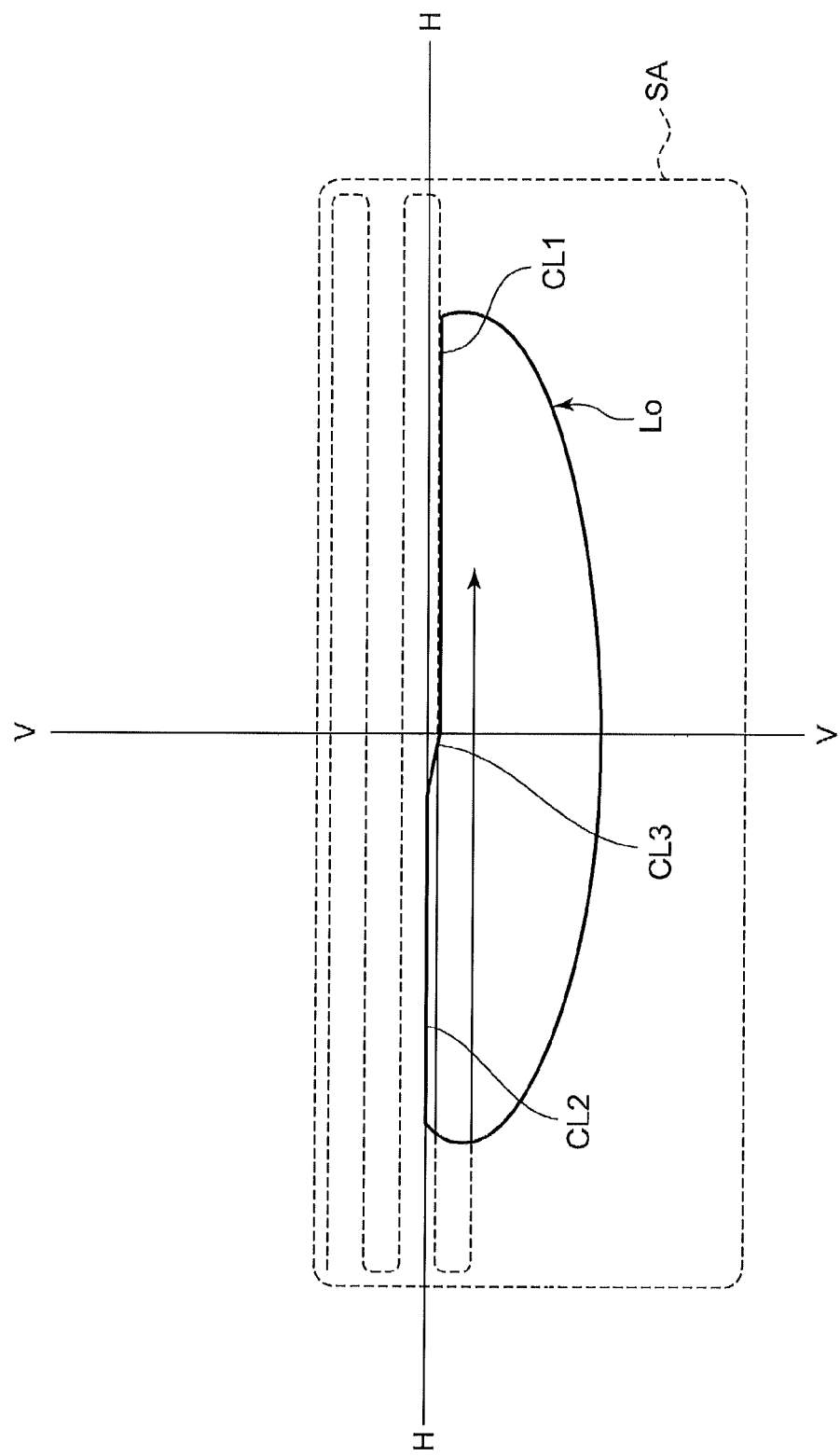
FIG. 4 shows an exemplary light distribution pattern formed by an automotive lamp according to a first embodiment.

FIG. 4 shows an exemplary light distribution pattern formed by the automotive lamp according to the first embodiment. FIG. 4 specifically shows a light distribution pattern formed on a virtual vertical screen placed at a predetermined position in front of the lamp, for example, at a point 25 meters ahead of the lamp.

The light distribution unit 300 of the automotive lamp 1 according to the present embodiment can scan a rectangular scan area SA, which extends in the vehicle width direction, with the white laser light W. When a scanning position of the light distribution unit 300 is within a low beam distribution pattern Lo, the light source control unit 410 of the control unit 400 has each light source emit the laser light. When the scanning position thereof is outside the low beam distribution pattern Lo, the light source control unit 410 stops the emission of the laser light from each light source. This forms a low beam distribution pattern Lo having a cutoff line on the side of an oncoming traffic lane CL1, a cutoff line on the side of a driver's own lane CL2 and a sloping cutoff line CL3.

The automotive lamp 1 according to the present embodiment distributes the white laser light W, which has been obtained by collecting the red laser light R, the green laser light G and the blue laser light B, to a front area of the vehicle and thereby forms a predetermined light distribution pattern. The wavelengths of laser light are more aligned than those of the light emitted from the phosphors or the like and therefore the variations in wavelength are small. In other words, the half width of laser light is narrower and the emission peak thereof is sharper. Thus, the red laser light R, the green laser light G and the blue laser light B are each a single light having higher color purity than that of fluorescence. Accordingly, if the light distribution pattern is formed using the white laser light W obtained by collecting these single-color laser lights, the color contrast of an object to be irradiated with the laser lights will be large. As a result, a driver visually recognizes the object to be irradiated with ease.

(Control Unit)

FIG. 5 is a functional block diagram for explaining a control unit. It will be obvious to those skilled in the art that the functional blocks shown in FIG. 5 may be implemented by a variety of manners including hardware only, software only or a combination of both. The control unit 400 has a lamp ECU 402, a ROM 404, a RAM 406, and so forth.

The lamp ECU 402 includes the actuator control unit 408 and the light source control unit 410. The ROM 404 stores various control programs. The RAM 406 is used for data storage and used as a work area for the programs executed by the lamp ECU 402. The lamp ECU 402 selectively executes a plurality of programs, stored in the ROM 404, as appropriate, and generates various control signals.

The actuator control unit 408 controls the scanning actuator 320 of the light distribution unit 300 and thereby controls the scanning of a front area of the vehicle using the white laser light W. The light source control unit 410 controls the emission of laser light from the first light source 102, the second light source 104 and the third light source 106, independently of each other. For example, when a light switch provided in the vehicle is operated by the driver, the light source control unit 410 controls the turning on and off of the first light source 102 to the third light source 106. A detailed description will be given later of the control performed by the light source control unit 410.

Also, the lamp ECU 402 can receive signals sent from the abnormality determining unit 140 of the monitoring unit 130. The light source control unit 410 generates control signals, which are used to regulate the outputs of the first light source 102 to the third light source 106, using the signals fed from the monitoring unit 130. Also, the lamp ECU 402 can send an operation command signal to a broadcasting unit 500 that broadcasts an abnormal output of light source(s). The broadcasting unit 500 may be configured by a warning lamp (indicator lamp) or the like provided in the vehicle, for instance. Also, the lamp ECU 402 can receive signals sent from an image processing apparatus 504, which receives data of images taken by an on-vehicle camera 502 and then analyzes the image data, and a navigation system 506, for instance.

A description is now given of a irradiation control of laser light performed by the automotive lamp 1 configured as above. If, in the automotive lamp 1 according to the present embodiment, a failure, deterioration or the like causes an emission abnormality in at least one of the first light source 102 to the third light source 106, the balance between the red, green and blue colors will be lost and therefore the color of the aggregate light may possibly be no longer white. Thus, when the emission abnormality is detected in at least one of the light sources, the light source control unit 410 adjusts the irradiation of at least one of the light source/sources, whose irradiation is abnormal, and the light sources/source, whose irradiation is normal, or the irradiation of at least one of the light sources so as to keep the white color of the white laser light W, which is the aggregate light. In other words, the light source control unit 410 restores the aggregate light, which has gone out of a predetermined white color range as a result of the emission abnormality in the light sources, within the predetermined white color range. As a result, the safety of the driver as well as pedestrians and the like surrounding the driver's vehicle can be ensured; also, a sense of discomfort or displeasure otherwise caused in the driver as well as the pedestrians and the like surrounding the driver's vehicle can be prevented.

More specifically, assume that when, for example, the irradiation intensity of the red laser light R falls below a predetermined range, the abnormality determining unit 140 of the monitoring unit 130 determines that an emission abnormality has occurred in the first light source 102. In this case, the light source control unit 410 outputs a control signal used to reduce the irradiation intensity of the green laser light G and the blue laser light B to the level of the irradiation intensity of the red laser light R. Thereby, the supply of power to the second light source 104 and the third light source 106 is reduced, for instance, and the irradiation intensity of the green laser light G and the blue laser light B is reduced by a reduced amount of the irradiation intensity of the red laser light R. As a result, the white color of the aggregate light remains intact.

Assume also that when, for example, the irradiation intensity of the red laser light R exceeds a predetermined range, the abnormality determining unit 140 of the monitoring unit 130 determines that an emission abnormality has occurred in the first light source 102. In this case, the light source control unit 410 outputs a control signal used to reduce the irradiation intensity of the red laser light G to the level of the irradiation intensity of the green laser light G and the blue laser light B. Thereby, the supply of power to the first light source 102 is reduced, for instance, and the irradiation intensity of the red laser light R is reduced to the level of the irradiation intensity of the green laser light G and the blue laser light B. As a result, the white color of the aggregate light remains intact.

The light source control unit 410 may regulate each light source as follows. That is, the light source control unit 410 receives the measured value of the irradiation intensity of each light source from the monitoring unit 130, and calculates the luminescent chromaticity or color temperature of the aggregate light using these measured values. Then the light source control unit 410 regulates each light source using both the calculated luminescent chromaticity or color temperature thereof and the reference value information regarding the luminescent chromaticity or color temperature thereof stored beforehand in the ROM 404.

Further, the lamp ECU 402 broadcasts the output abnormality of a light source via the broadcasting unit 500, when the control is performed such that the white color remains intact by regulating the irradiation of each light source and when consequently the irradiation intensity of the aggregate light obtained after the adjustment of irradiation thereof lies outside a predetermined range. More specifically, when the abnormality determining unit 140 of the monitoring unit 130 determines that the irradiation intensity of the white laser light W after the irradiation adjustment lies outside the predetermined range, the lamp ECU 402 outputs a control signal, with which to instruct the warning lamp to light up, to the broadcasting unit 500. Thereby, the driver is notified of the abnormality occurring in the automotive lamp 1. When the irradiation intensity of the white laser light W has gone out of the predetermined range, the light source control unit 410 may continue to irradiate the white laser light W whose irradiation intensity is low, in order to even slightly improve the visibility of the driver or may stop the irradiation of the white laser light W in order to prompt the user to replace or repair the automotive lamp 1 as early as possible.

When it is determined that at least one of the first light source 102 to the third light source 106 suffers from an emission abnormality, control may be performed such that the light source control unit 410 turns off all the light sources and such that the broadcasting unit 500 broadcasts the abnormality of any one of the light sources.

As described above, the automotive lamp 1 according to the present embodiment is comprised of the first light source 102, which emits the red laser light R, the second light source 104, which emits the green laser light G, and the third light source 106, which emits the blue laser light B. Then at least these three laser lights are collected so as to generate the white laser light W, and the white laser light W is distributed so as to form a predetermined light distribution pattern. In this manner, irradiated is the white laser light W formed by the red laser light R, the green laser light G and the blue laser light B each having high color purity, so that the color contrast of an object to he irradiated with the laser lights can be made large. As a result, the visibility of the driver can be further improved.

(Second Embodiment)

The structure of an automotive lamp 1 according to a second embodiment is basically the same as that of the automotive lamp 1 according to the first embodiment except for how the irradiation of laser lights is controlled by the light source control unit 410. The same structural components as those of the first embodiment are given the same reference numerals and the repeated description thereof and its representation by figures will be omitted as appropriate.

The automotive lamp 1 according to the present embodiment has a first error processing mode in which the white color of the light irradiated from the lamp is kept intact by regulating the emission of laser light from the light source and a second error processing mode in which the color of light irradiated from the lamp is no longer white (namely, the whiteness degree of the irradiated light is sacrificed) but the irradiation intensity of the lamp is maintained intact. The second error processing mode is carried out when it is difficult to carry out the first error processing mode, namely when the irradiation intensity of the white laser light W gets too low as a result of the execution of the first error processing mode, for instance.

Where the automotive lamp 1 is used as an automotive headlamp, it is required that the irradiated light in the automotive lamp 1 be of a predetermined white color for the purpose of preventing a mistaken action such as a case when pedestrians or drivers of other vehicles mistake the frontward direction of his/her own vehicle for the rearward direction thereof or vice versa. However, there may be cases where it is required of the automotive lamp 1 that the visibility of the driver be assured by irradiating the light even if the irradiated light lies outside a predetermined white range.

Thus, the light source control unit 410 first carries out the first error processing mode. In other words, when an emission abnormality is detected in any one of a plurality of light sources, the light source control unit 410 regulates at least one of the plurality of light sources so as to maintain the white color of the aggregate light. Then, if, after the execution of the first error processing mode, the abnormality determining unit 140 of the monitoring unit 130 determines that the irradiation intensity of the aggregate light after adjustment lies outside the predetermined range, the light source control unit 410 will maintain the irradiation intensity of the aggregate light by regulating the irradiation of the light source. More specifically, if, for example, the irradiation intensity of the red laser light R falls below a predetermined range, the light source control unit 410 will increase the irradiation intensity of at least one the green laser light G and the blue laser light B so as to maintain the irradiation intensity of the aggregate light.

When the abnormal output of light source(s) is detected, the light source control unit 410 may calculate the irradiation intensity of the aggregate light, which would have been obtained when the first error processing mode was carried out, using the irradiation intensity value of each light source obtained from the monitoring unit 130, and may select the first error processing mode and/or the second error processing mode based on the thus calculated irradiation intensity of the aggregate light. In the present embodiment, the control performed by carrying out the first error processing and the second error processing mode may be applied to an automotive lamp equipped with the light sources other than the laser light sources.

(Third Embodiment)

In an automotive lamp according to a third embodiment, the arrangement of a light source unit 100 and a light distribution unit 300 in a right-hand headlamp unit differs from that in a left-hand headlamp unit. The same structural components as those of the first embodiment are given the same reference numerals and the repeated description thereof and its representation by figures will be omitted as appropriate.

Figure 6A:
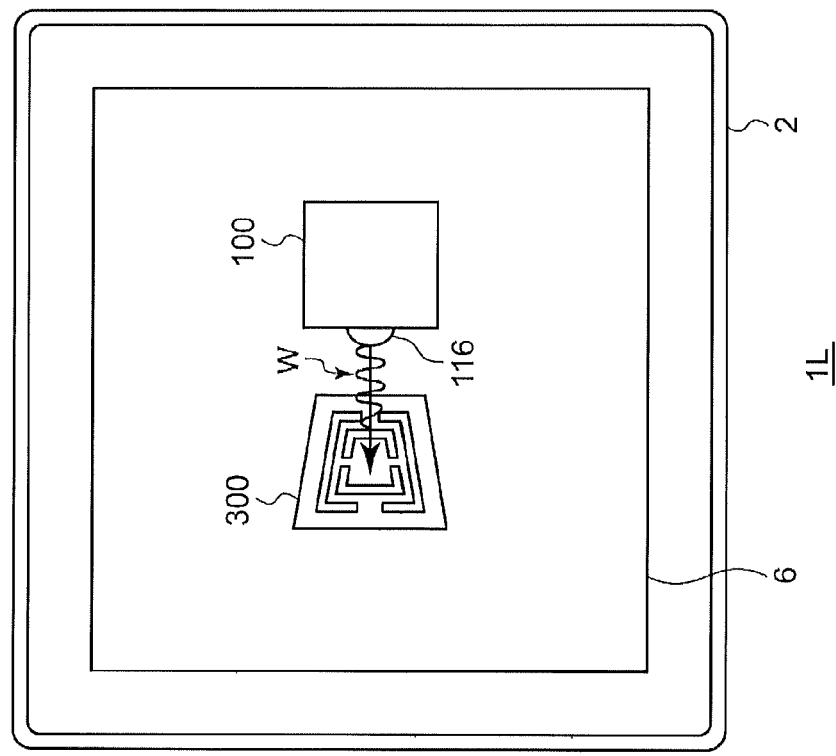
FIG. 6A is a front view showing schematically a structure of an automotive lamp constituting a right-hand headlamp unit according to a third embodiment.
Figure 6B:
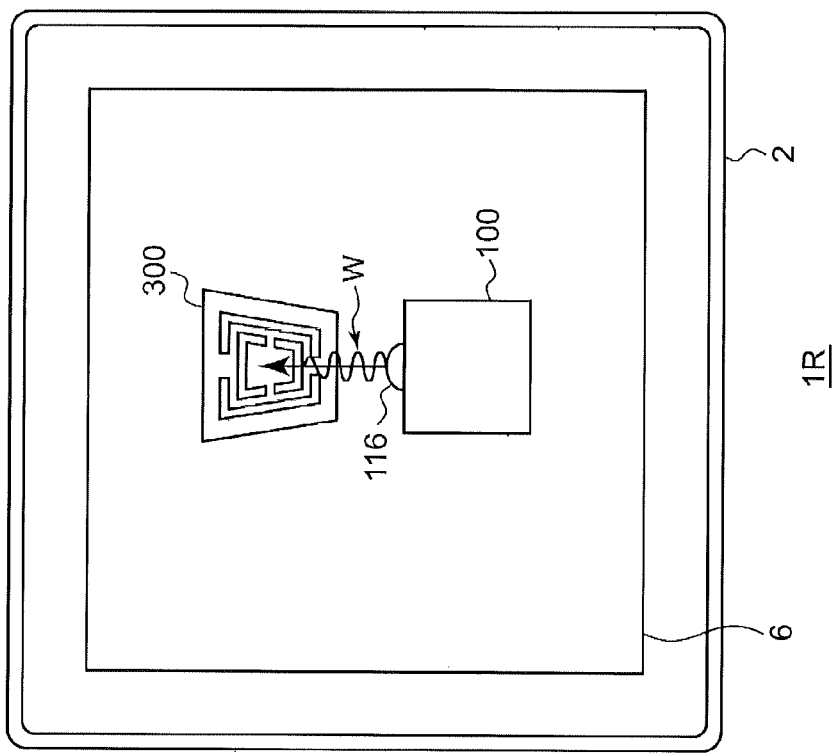
FIG. 6B is a front view showing schematically a structure of an automotive lamp constituting a left-hand headlamp unit according to a third embodiment.

FIG. 6A is a front view showing schematically a structure of an automotive lamp constituting the right-hand headlamp unit according to the third embodiment. FIG. 6B is a front view showing schematically a structure of an automotive lamp constituting the left-hand headlamp unit according to the third embodiment. In FIGS. 6A and 6B, the polarization direction of the white laser light W is schematically indicated. In an automotive lamp 1R constituting the right-hand headlamp unit, the arrangement is such that the light source unit 100 and the light distribution unit 300 are vertically placed side by side. In the present embodiment, the light source unit 100 is placed on a lower side and the light distribution unit 300 is placed on an upper side. The white laser light W is irradiated upward in the vertical direction from the light source unit 100, and is then reflected toward a front area of the lamp by the light distribution unit 300. Note that the light source unit 100 may be placed on the upper side and the light distribution unit 300 may be placed on the lower side and that the white laser light W may be irradiated downward in the vertical direction from the light source unit 100.

On the other hand, in an automotive lamp 1L constituting the left-hand headlamp unit, the arrangement is such that the light source unit 100 and the light distribution unit 300 are horizontally placed side by side. In the present embodiment, the light source unit 100 is placed outward in the vehicle width direction and the light distribution unit 300 is placed inward in the vehicle width direction. The white laser light W is irradiated inward in the vertical direction from the light source unit 100, and is then reflected toward a front area of the lamp by the light distribution unit 300. Note that the light source unit 100 may be placed inward in the vehicle width direction and the light distribution unit 300 may be placed outward in the vehicle width direction and that the white laser light W may be irradiated outward in the vehicle width direction from the light source unit 100.

In general, the laser light is a linearly polarized light. Accordingly, when the laser light is irradiated toward a front area of the vehicle, there are cases where the color of an object to be irradiated with the laser light looks different from the actual color thereof depending on the object. If, for example, the object to be irradiated therewith is a white lane mark formed on a road surface, the lane mark may be tinged with red or green due to the polarization of the laser light. This may possibly cause an uncomfortable or unpleasant feeling in the driver.

In contrast to this, according to the present embodiment, the laser light emission directions of the light source units 100 are shifted by 90 degrees from each other in between the left-hand automotive lamp 1L and the right-hand automotive lamp 1R. Thus, the polarization axis (polarization direction) of the white laser light W emitted from the automotive lamp 1L is perpendicular to the polarization axis of the white laser light W emitted from the automotive lamp 1R. In the present embodiment, the polarization axis of the white laser light W in the automotive lamp 1L is so set as to extend in the vertical direction, whereas the polarization axis of the white laser light W in the automotive lamp 1R is so set as to extend in the vehicle width direction. This can suppress the change in the color of the object to be irradiated therewith and can therefore suppress an uncomfortable or unpleasant feeling felt by the driver.

(Fourth Embodiment)

The structure of an automotive lamp 1 according to a fourth embodiment is basically the same as that of the automotive lamp 1 according to the first embodiment excepting that the color of the light distribution pattern is varied partially or entirely. The same structural components as those of the first embodiment are given the same reference numerals and the repeated description thereof and its representation by figures will be omitted as appropriate.

Figure 7A:
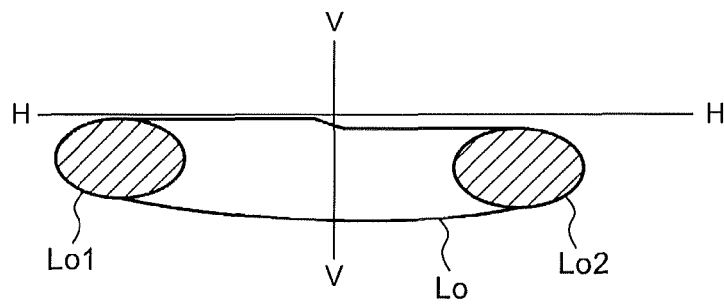
FIG. 7A is an exemplary light distribution pattern formed by an automotive lamp according to a fourth embodiment.
Figure 7B:
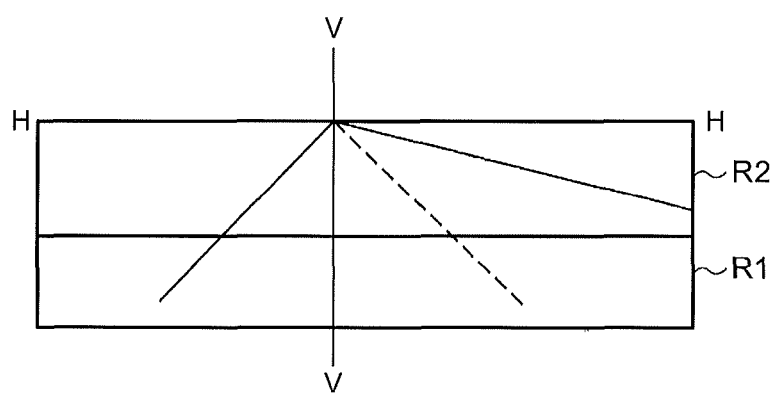
FIG. 7B is another exemplary light distribution pattern formed by an automotive lamp according to a fourth embodiment.
Figure 7C:
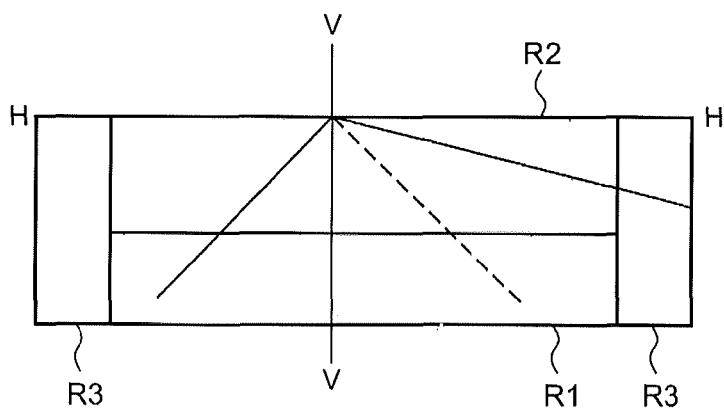
FIG. 7C is still another exemplary light distribution pattern formed by an automotive lamp according to a fourth embodiment.

FIG. 7A is an exemplary light distribution pattern formed by an automotive lamp according to the fourth embodiment. FIG. 7B is another exemplary light distribution pattern formed by the automotive lamp according to the fourth embodiment. FIG. 7C is still another exemplary light distribution pattern formed by the automotive lamp according to the fourth embodiment. Each of FIGS. 7A to 7C shows a light distribution pattern formed on a virtual vertical screen placed at a predetermined position in front of the lamp, for example, at a point 25 meters ahead of the lamp.

The automotive lamp 1 according to the present embodiment varies the laser light irradiated toward a front area of the vehicle, namely the color of the aggregate light, according to a predetermined condition. For example, the relative visibility of blue light by human eyes at a dark place is higher than that at a bright place. Thus, when, as shown in FIG. 7A, the white laser light W is distributed to a left-end partial region Lo1 of the low beam distribution pattern Lo in the vehicle width direction and a right-end partial region Lo2 thereof in the vehicle width direction, the light source control unit 410 increases the irradiation intensity of the blue laser light B. Thereby, the partial region Lo1 and the partial region Lo2 can be irradiated using a white light distribution pattern tinged with blue. Hence, the visibility of the driver in these regions can be further improved. As a result, the driver can more reliably recognize the presence of pedestrians and obstacles, if any, on the shoulder area of the road, for instance.

Also, the light source control unit 410 may vary the color of the aggregate light according to the age of the driver. For example, the blue light tends to scatter inside an eyeball due to the clouding of his/her eye's crystalline lens. Thus, if an elderly person, with a high tendency to suffer from the clouding of his/her eye's crystalline lens, drives the vehicle, the light source control unit 410 will emit the white laser light W having a color temperature lower than a preset initial set value so as to form the light distribution pattern. Thereby, the visibility of the driver can be further improved. Such control as this is performed as follows, for instance. That is, the vehicle is equipped with an input unit (not shown) to which the driver himself/herself enters his/her own age, and a conversion table that associates the ages with the color temperatures of the white laser light W is stored beforehand in the ROM 404. The light source control unit 410 determines the color temperature of the white laser light W to be emitted, using the age information received from the input unit and the conversion table. Then the emission of laser light from each light source is regulated and the white laser light W having the thus determined color temperature is generated.

Also, the light source control unit 410 may vary the color of the aggregate light according to how many hours the driver has been driving the vehicle. For example, the blue light tends to fatigue the driver. Thus, if the driving hours are greater than or equal to a predetermined length of time, the light source control unit 410 will emit the white laser light W having a color temperature lower than a preset initial set value so as to form the light distribution pattern. This can reduce the fatigue of the driver. Such control as this is performed as follows, for instance. That is, the lamp ECU 402 has a not-shown calculator for calculating the driving hours, and a conversion table that associates the driving hours with the color temperatures of the white laser light W is stored beforehand in the ROM 404. The calculator receives, for example, an on-off signal of an ignition power from a vehicle side and calculates the time length, from when a vehicle's ignition is turned on until it is tuned off, as the driving hours. The light source control unit 410 determines the color temperature of the white laser light W to be emitted, using the driving hour information received from the calculator and the conversion table. Then the emission of laser light from each light source is regulated and the white laser light W having the thus determined color temperature is generated.

Also, the light source control unit 410 may display a partial region of the light distribution pattern, overlapping with an object to be recognized by the driver, with a color different from the colors indicating the other regions. For example, the data of image, of a front area of the vehicle, captured by the on-vehicle camera 502 is analyzed by the image processing apparatus 504 and then the positions of pedestrians, obstacles and the like present in the front area of the vehicle are identified. The positional information on the pedestrians and the like identified by the image processing apparatus 504 is sent to the lamp ECU 402. When the white laser light W is to be distributed to a region of the light distribution pattern overlapping with the pedestrians and the like, the light source control unit 410 increases the irradiation intensity of the red laser light R, for instance, and then irradiates this region thereof with a magenta light. This allows the driver to more reliably recognize the presence of the pedestrians, obstacles and the like. Or alternatively, the light source control unit 410 may identify the present position of the object to be recognized using the road shape information acquired from the navigation system 506 and may regulate a light source, when the white laser light W is distributed to a region overlapping with this present position thereof, so as to change the color of the light distribution pattern.

Also, as shown in FIG. 7B, an illuminated region in front of the vehicle may be divided into a region R1 near the vehicle and a region R2 far from the vehicle. Then the light source control unit 410 may emit the white laser light W, having a relatively low color temperature, to the region R1 and emit the white laser light W, having a relatively high color temperature, to the region R2. For example, the region R2 is irradiated with the white laser light W having a preset initial set value, whereas the region R1 is irradiated with the white laser light W tinged with yellow as compared with the light of this preset initial value. As a result, the visibility of the driver can be further improved.

Also, as shown in FIG. 7C, the illuminated region in front of the vehicle may be further divided into three regions R1, R2 and R3 (i.e., in addition to the above-described regions R1 and R2) where the region R3 is located outward in the vehicle width direction. Then the light source control unit 410 may emit the white laser light W, having a preset initial set value, to the region R2, emit the white laser light W tinged with yellow, as compared with the light of this preset initial value, to the region R1 and emit the white laser light W tinged with blue as compared therewith, to the region R3. As a result, the visibility of the driver can be further improved.

The present invention is not limited to each of the above-described embodiments only, and those resulting from any combination of the embodiments are effective as embodiments. Also, it is understood by those skilled in the art that various modifications such as changes in design may be added to each of the embodiments based on their knowledge and newly combined embodiments or embodiments added with such modifications are also within the scope of the present invention. Any new embodiments resulting from the combination of any two or more of the above-described embodiments or the combination of any of the above-described embodiments with any of the following modifications has each an advantageous effect enjoyed by each of the original embodiment and modification as well.

In each of the above-described embodiments, the white laser light W is formed by the red laser light R, the green laser light G and the blue laser light B. However, laser light of other colors such as orange and yellow may be contained in the white laser light W.

In each of the above-described embodiments, the light distribution unit 300 is configured by the galvanometer mirror. However, this should not be considered as limiting and the light distribution mirror may be a reflector such as a polygon mirror type, MEMS mirror type and parabola type, for instance.

What is claimed is:
1. An automotive lamp comprising:
a first light source that emits a red laser light;
a second light source that emits a green laser light;
a third light source that emits a blue laser light;

a light condensing unit that collects at least the red laser light, the green laser light and the blue laser light so as to generate a white laser light;

a light distribution unit that distributes the white laser light so as to form a predetermined light distribution pattern;

a monitoring unit that monitors the emission of laser light from the first light source, the second light source, and the third light source; and an abnormality determining unit that determines whether or not any abnormality occurs in the emission of laser light at the first light source, the second light source, and the third light source, based on a result of monitoring by the monitoring unit.

2. The automotive lamp according to claim 1, wherein the first light source, the second light source, and the third light source are arranged such that:

the first light source is arranged in a position nearest to the light condensing unit, the third light source is arranged in a position farthest from the light condensing unit, and the second light source is arranged in an intermediate position between the first light source and the third light source.

3. The automotive lamp according to claim 1, wherein each of the first light source, the second light source, and the third light source includes a light emitting element and a substrate on which the light emitting element is mounted, light emission surfaces of the light emitting elements are parallel to each other, and the first light source, the second light source, and the third light source are arranged such that parts of the substrates of adjacent light sources overlap with each other, as viewed from a direction that intersects with the laser light emission surfaces of the respective light sources.

4. The automotive lamp according to claim 1, wherein the light distribution unit includes a reflecting mirror, reflects the white laser light in front of the lamp by using the reflecting mirror, and scans a front area of the vehicle using the white laser light by reciprocating movement of the reflecting mirror.

5. The automotive lamp according to claim 1, further comprising:

a lamp ECU that controls the operation of the automotive lamp, wherein the abnormality determination unit is provided in the lamp ECU.

6. The automotive lamp according to claim 1, further comprising:

a light source control unit that controls the emission of laser light from the first light source, the second light source, and the third light source, wherein the light source control unit regulates the emission of laser light from at least one of the first light source, the second light source, and the third light source so as to keep the white color of the white laser light intact, when the abnormality determination unit detects an emission abnormality in at least one of the light sources.

7. The automotive lamp according to claim 1, further comprising:

a light source control unit that controls the emission of laser light from the first light source, the second light source, and the third light source, wherein the light source control unit carries out at least one of a first error processing mode in which the white color of the white laser light is kept intact by regulating the emission of laser light from at least one of the first light source, the second light source, and the third light source, and a second error processing mode in which the irradiation intensity of the white laser light is maintained intact by regulating the emission of laser light from at least one of the first light source, the second light source, and the third light source, when the abnormality determination unit detects an emission abnormality in at least one of the light sources.

8. The automotive lamp according to claim 1, further comprising:

an automotive lamp constituting a right-hand headlamp unit and an automotive lamp constituting a left-hand headlamp unit, wherein p1 the directions of emission of the white laser light from the light condensing unit toward the light distribution unit are shifted by 90 degrees from each other in between the automotive lamp constituting the right-hand headlamp unit and the automotive lamp constituting the left-hand headlamp unit.

9. The automotive lamp according to claim 1, further comprising:

a light source control unit that controls the emission of laser light from the first light source, the second light source, and the third light source, wherein the light source control unit varies the color of the white laser light according to a predetermined condition and varies the color of the light distribution pattern at least partially.

10. The automotive lamp according to claim 9, wherein the light source control unit varies the color of the white laser light according to the age of the driver.

11. The automotive lamp according to claim 9, wherein the light source control unit varies the color of the white laser light according to how many hours the driver has been driving the vehicle.

12. The automotive lamp according to claim 1, further comprising:

a light source that emits an orange or yellow laser light, wherein the light condensing unit collects the red laser light, the green laser light, the blue laser light, and the orange or yellow laser light so as to generate a white laser light.

* * * * *